US012614859B2

(12) United States Patent
Kim et al.

(10) Patent No.: US 12,614,859 B2
(45) Date of Patent: Apr. 28, 2026

(54) DEVICE FOR EXTENDING A SCAN RANGE OF A PHASED ANTENNA ARRAY

(71) Applicants: Huawei Technologies Canada Co., Ltd., Kanata (CA); The Governing Council of the University of Toronto, Toronto (CA)

(72) Inventors: Jaemin Kim, Toronto (CA); Wenyao Zhai, Stittsville (CA); George Eleftheriades, Scarborough (CA); Gleb Egorov, Toronto (CA)

(73) Assignees: Huawei Technologies Canada Co., Ltd., Kanata (CA); The Governing Council of the University of Toronto, Toronto (CA)

( * ) Notice: Subject to any disclaimer, the term of this patent is extended or adjusted under 35 U.S.C. 154(b) by 86 days.

(21) Appl. No.: 18/830,030

(22) Filed: Sep. 10, 2024

(65) Prior Publication Data

US 2025/0087898 A1 Mar. 13, 2025

Related U.S. Application Data

(63) Continuation of application No. PCT/CA2022/050367, filed on Mar. 11, 2022.

(51) Int. Cl.
*H01Q 21/00* (2006.01)
*H01Q 15/00* (2006.01)
*H01Q 25/00* (2006.01)

(52) U.S. Cl.
CPC ..... *H01Q 21/0031* (2013.01); *H01Q 15/0086* (2013.01); *H01Q 25/008* (2013.01)

(58) Field of Classification Search
CPC ........... H01Q 21/0031; H01Q 15/0086; H01Q 25/008; H01Q 15/10; H01Q 19/062
See application file for complete search history.

(56) References Cited

U.S. PATENT DOCUMENTS

| | | | | |
|---|---|---|---|---|
| 8,659,502 | B2 | 2/2014 | Lam et al. | |
| 9,557,585 | B1 | 1/2017 | Yap et al. | |
| 9,583,840 | B1 * | 2/2017 | Lawrance | H01Q 15/04 |
| 9,806,428 | B2 * | 10/2017 | Haluba | H01Q 19/062 |
| 2009/0315794 | A1 | 12/2009 | Alamouti et al. | |

(Continued)

OTHER PUBLICATIONS

H. Kawahara, H. Deguchi, M. Tsuji, and H. Shigesawa. Design of rotational dielectric dome with linear array feed for wide-angle multi beam antenna applications. Electronics and Communications in Japan (Part II: Electronics), 90 (5):49-57, 2007.

(Continued)

*Primary Examiner* — Seung H Lee
(74) *Attorney, Agent, or Firm* — Tim Tingkang Xia, Esq.; Troutman Pepper Locke LLP

(57) ABSTRACT

A phased antenna array is operable to generate a radio-frequency beam having a first beam angle. A converging lens adjusts the beam generated by the phased antenna array to output a first adjusted beam. A diverging lens adjusts the first adjusted beam to output a second adjusted beam having a second beam angle. The converging lens and the diverging lens are positioned relative to the phased antenna array such that the second beam angle is greater than the first beam angle, such that a scan range of the phased antenna array is increased.

20 Claims, 13 Drawing Sheets

(56) References Cited

U.S. PATENT DOCUMENTS

| | | | | |
|---|---|---|---|---|
| 2012/0306708 | A1 | 12/2012 | Henderson et al. | |
| 2022/0013906 | A1 * | 1/2022 | Kinamon | H04W 28/18 |

OTHER PUBLICATIONS

H. Steyskal, A. Hessel, and J. Shmoys. On the gain-versus-scan trade-offs and the phase gradient synthesis for a cylindrical dome antenna. IEEE Trans. Antennas Propag., vol. 27, No. 6, pp. 825-831, Nov. 1979.

T. A. Lam, D. C. Vier, J. A. Nielsen, C. G. Parazzoli, and M. H. Tanielian. Steering phased array antenna beams to the horizon using a buckyball NIM lens. Proc. IEEE, vol. 99, No. 10, pp. 1755-1767, Oct. 2011.

G. A. Egorov and G. V. Eleftheriades. Theory and simulation of metasurface lenses for extending the angular scan range of phased arrays. IEEE Trans. Antennas Propag., vol. 68, No. 5, pp. 3705-3717, Aug. 2020.

* cited by examiner

DEVICE FOR EXTENDING A SCAN RANGE OF A PHASED ANTENNA ARRAY

CROSS-REFERENCE TO RELATED APPLICATION

This application is a continuation of Patent Cooperation Treaty Application Serial No. PCT/CA2022/050367, filed Mar. 11, 2022, the content of which is incorporated herein by reference in its entirety.

FIELD

The present disclosure relates to the field of wireless network communications, and in particular to devices and methods for extending a scan range of a phased antenna array.

BACKGROUND

Emerging 5G telecommunication systems and beyond are proposing to use the millimeter-wavelength spectrum (i.e. at frequencies>30 GHZ) in order to support wide bandwidths and high-throughput data rates. At these frequencies, however, line-of-sight propagation prevails and point-to-point data links are therefore favoured.

In order to alleviate this issue, the industry is adopting the use of scannable phased arrays in the base station and possibly at the level of handsets. At the base station, arrays of the order of 16×16 elements are typically required to provide the required gain and narrow beamwidths needed to maintain robust data links with possibly moving users. Ideally, a complete transceiver is required behind each antenna, for full-range scanning functionality. This can, however, lead to exponentially increasing cost and power dissipation. The cost of the underlying phased array can be reduced by spacing the antenna elements by more than half a wavelength. While this results in simplified hardware (e.g. through sub-arraying), it can limit the scan range (which may also be referred to as the scan angle) due to the appearance of grating lobes.

Some prior attempts at increasing the scan range of a phased antenna arrays are based on the use of thick dielectric radomes. However, the bulky nature of such solutions inevitably leads to reflection loss at the interface between the dielectric and the air, in turn leading to high gain and directivity degradation.

SUMMARY

According to a first aspect of the disclosure, there is provided a device comprising: a phased antenna array operable to generate a radio-frequency beam having a first beam angle; a converging lens for adjusting the beam generated by the phased antenna array to output a first adjusted beam; and a diverging lens for adjusting the first adjusted beam to output a second adjusted beam having a second beam angle, wherein the converging lens and the diverging lens are positioned relative to the phased antenna array such that the second beam angle is greater than the first beam angle, and such that as a result a scan range of the phased array is increased. Accordingly, the device may increase the scan range of the phased antenna array, while being relatively low-profile and benefiting from reduced directivity degradation. Generally, a scan range of a phased antenna array may be defined, according to some embodiments, as a range through which a main beam generated by the phased antenna array may be steered.

The converging lens may comprise a first metasurface having formed thereon first subwavelength structures for manipulating electromagnetic waves of the beam generated by the phased antenna array. The diverging lens may comprise a second metasurface having formed thereon second subwavelength structures for manipulating the electromagnetic waves manipulated by the first subwavelength structures.

One or more of each of the first subwavelength structures and each of the second subwavelength structures may comprise: a metallized loop structure comprising at least one capacitive element; and a metallized central strip comprising one or more of: at least one capacitive or inductive element; and a serpentine shape.

One or more of each of the first subwavelength structures and each of the second subwavelength structures may be configured such that one or more of the beam generated by the phased antenna array and the first adjusted beam is reflected by no more than 5% when the beam interacts with the subwavelength structure. As result, due to the low reflection losses at the metasurfaces, the device may benefit from reduced directivity degradation.

One or more of the converging lens and the diverging lens may have one or more of: a width and/or a length of from about 10λ to about 15λ, wherein λ is a wavelength of electromagnetic waves of the beam generated by the phased antenna array; and a thickness of less than 1λ.

The phased antenna array, the converging lens, and the diverging lens may be positioned relative to one another such that $d_l-f_c-f_d=0$, wherein: $d_l$ is a distance separating the converging lens from the diverging lens; $f_c$ is a focal length of the converging lens; and $f_d$ is a focal length of the diverging lens.

$1-(d_l/f_d)$ may be at least 2, wherein: $d_l$ is a distance separating the converging lens from the diverging lens; and $f_d$ is a focal length of the diverging lens.

One or more of the converging lens and the diverging lens may be planar or curved.

The converging lens and the diverging lens may be located in a near-field region of the phased antenna array. Accordingly, the combination of the phased antenna array, the converging lens, and the diverging lens may be provided in a relatively low-profile structure.

According to a further aspect of the disclosure, there is provided a method of increasing a scan range of a phased antenna array, comprising: generating, using the phased antenna array, the radio-frequency beam having a first beam angle; receiving, by a converging lens, the radio-frequency beam, and outputting a first adjusted beam from the converging lens; and receiving, by a diverging lens, the first adjusted beam, and outputting a second adjusted beam from the diverging lens, wherein the second adjusted beam has a second beam angle, wherein the second beam angle is greater than the first beam angle such that the scan range of the phased array is increased.

After passing through the converging lens and the diverging lens, a degradation of a directivity of the beam may be no more than 3 dB. Thus, the device may suffer from reduced directivity degradation when compared to prior art devices.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

Embodiments of the disclosure will now be described in detail in conjunction with the accompanying drawings of which.

DETAILED DESCRIPTION

Figure 1:
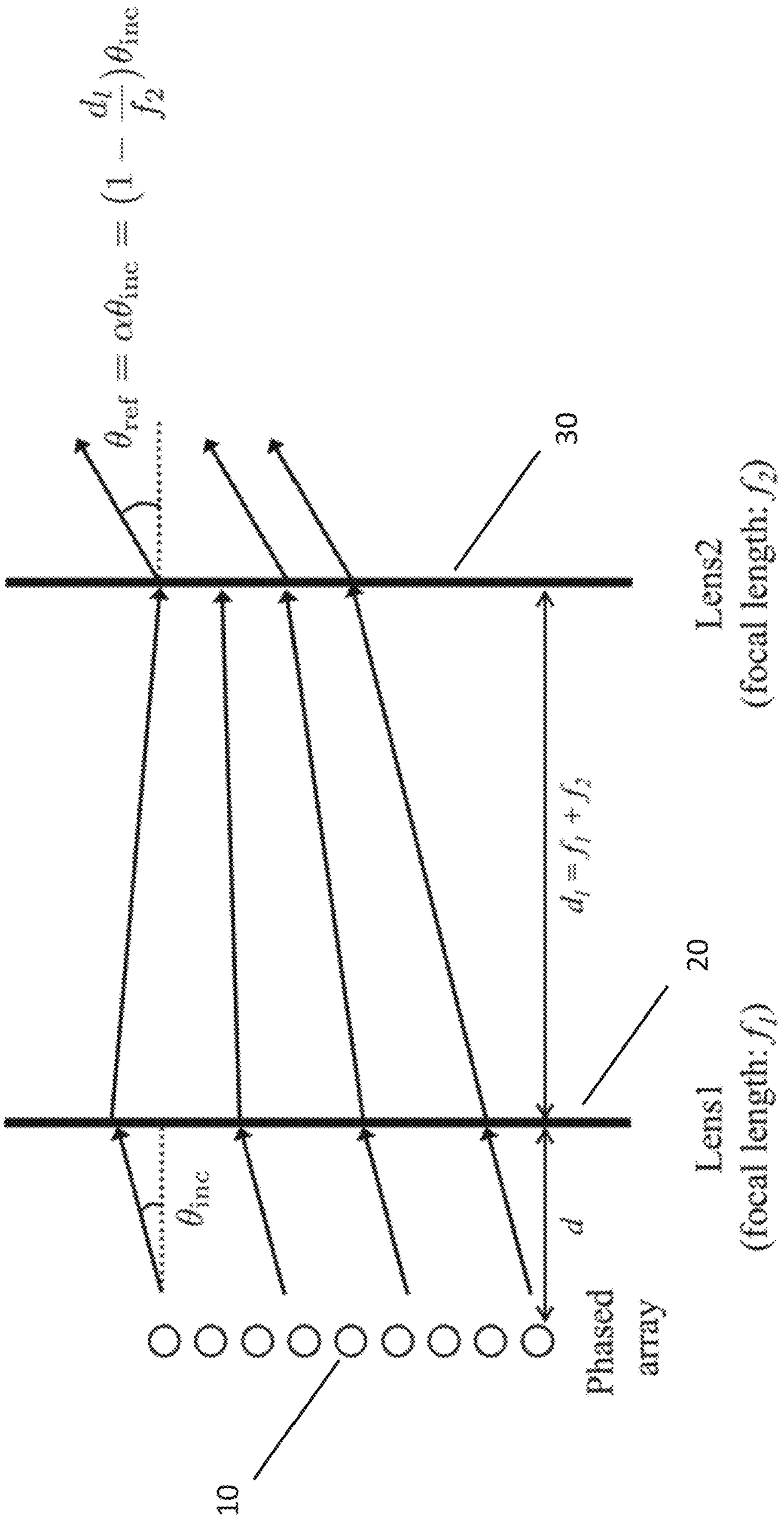
FIG. 1 shows a schematic representation of a device for extending a scan range of a phased antenna array, according to an embodiment of the disclosure.

The present disclosure seeks to provide improved devices and methods for extending a scan range of a phased antenna array. While various embodiments of the disclosure are described below, the disclosure is not limited to these embodiments, and variations of these embodiments may well fall within the scope of the disclosure which is to be limited only by the appended claims.

Generally, there is described a device for increasing or extending a scan range of a phased antenna array. The device includes dual lenses positioned in proximity to a phased antenna array, for adjusting a radio-frequency beam generated by the phased antenna array so as to thereby increase a beam angle of the radio-frequency beam. The dual lenses include a first lens for adjusting the beam output by the phased antenna array, and a second lens for further adjusting the beam adjusted by the first lens. The first and second lenses may be metasurface lenses having formed thereon subwavelength structures (which may otherwise be referred to as unit cells) for manipulating the electromagnetic waves of the beam, and to thereby adjust the beam so as to increase the beam angle of the beam. The degree of extension of the beam angle may be associated with a factor $\alpha$. Depending on the selected focal lengths of the first and second lenses, as well as the distance separating the first and second lenses, a may be varied. According to some embodiments, $\alpha$ is at least 2 such that the beam angle of the beam output from the phased array is at least doubled.

The dual lenses may be positioned arbitrarily close to the phased array. This may enable the phased array to be easily integrated with the dual lenses, leading to a low-profile device with an extended scan range. Furthermore, the low profile may enable the combination of the phased antenna array and the dual metasurface lenses to form a single, monolithic structure. According to some embodiments, instead of using metasurface lenses, the lenses may be other types of lenses, such as dielectric lenses.

Advantageously, the use of relatively flat metasurfaces may simplify the manufacturing process of the lenses, by avoiding the need to manufacture complex three-dimensional structures. According to some embodiments, instead of being flat, the metasurfaces may be curved, depending on the particular application. The metasurfaces may be manufactured according to relatively low-cost methods such as by using printed circuit board fabrication techniques, although other types of manufacturing techniques may be used, such as low-temperature co-fired ceramic (LTCC) techniques, or embedded wafer level ball grid array (eWLB) techniques.

Metasurface lenses may additionally reduce the degree of reflections at the surface of the metasurface, thus reducing losses and increasing the overall efficiency of the device. For example, according to some embodiments, the transmission of each metasurface lens may be at least 95% or 97%. Furthermore, since both the electric and magnetic comments of the beam may be manipulated by the metasurface (unlike dielectric domes), the metasurfaces may be very small (about 10-15 wavelengths in width and/or length, and less than 1 wavelength in thickness) while still being able to perform their intended lensing functionality. In particular, the metasurface lenses may be as thin as a tenth of the wavelength of the beam. Moreover, the metasurface lenses may also enable the desired scan range extension while also suffering from a relatively lower degree of directivity degradation (as dictated by physical constraints such as power conservation).

Still further, the lenses may be used in combination with a variety of different antenna arrays, such as standard, interleaved, and sub-arrayed antennae.

Turning to FIG. 1, there is shown an embodiment of a general arrangement of a device for increasing a scan range of a phased antenna array. The device may be incorporated, for example, into a base station of a wireless communication network. The arrangement includes phased antenna array 10, and dual lenses comprising a first, converging metasurface lens 20 and a second, diverging metasurface lens 30 positioned in relation to antenna array 10. Metasurface lens 20 is positioned closer to antenna array 10 than metasurface lens 30. As described in further detail below, each metasurface lens comprises a number of unit cells or subwavelength structures. These subwavelength structures are configured to perform wavefront manipulation on incident EM waves.

In FIGS. 1, $f_1$ and $f_2$ are respectively the focal lengths of metasurface lens 20 and metasurface lens 30, and $d_l$ is the distance separating metasurface lens 20 from metasurface lens 30. As can be seen in FIG. 1, $d_l=f_1+f_2$. The angle of incidence (e.g. the beam angle) of the beam output by phased array 10 is shown as $\theta_{inc}$, and the angle of refraction of the beam exiting metasurface lens 30 is shown as $\theta_{ref}$. As described above, the parameter a is a measure of the degree of enhancement of the beam angle of the beam generated by phased array 10, and is equal to $\theta_{ref}/\theta_{inc}$ and $1-d_l/f_2$. Furthermore, with $d_l=f_1+f_2$, $\alpha$ is equal to 2. The desired angle or range of the beam output from metasurface lens 30 can therefore be adjusted by controlling the magnification factor $\alpha$. Metasurface lens 20 and metasurface lens 30 may be located within the near-field region of phased array 10, which may lead to the combination of phased array 10, metasurface lens 20, and metasurface lens 30 being comprised in a low-profile device, since the distance between phased array 10 and metasurface lens 20, d, is an independent parameter for extending the beam angle of the beam generated by phased array 10. The near-field region is defined as being less than $2D^2/\lambda$, wherein D is the largest dimension of the elements of the phased array, and A is the wavelength of the electromagnetic waves of the beam.

Generally, the ray transfer matrix equation for the dual-lens system shown in FIG. 1 is set out below:

$$\begin{bmatrix} x' \\ \theta_{ref} \end{bmatrix} = \begin{bmatrix} 1 - \frac{d_l}{f_1} & d\left(1 - \frac{d_l}{f_1}\right) + d_l \\ \frac{1}{f_1 f_2}(d_l - f_1 - f_2) & 1 - \frac{d_l}{f_2} + \frac{d}{f_1 f_2}(d_l - f_1 - f_2) \end{bmatrix} \begin{bmatrix} x \\ \theta_{inc} \end{bmatrix},$$

where d is the distance between phased array 10 and metasurface lens 20, d is the distance between metasurface lens 20 and metasurface lens 30, and $f_1$ and $f_2$ are the focal lengths of metasurface lens 20 and metasurface lens 30, respectively.

Figure 2:
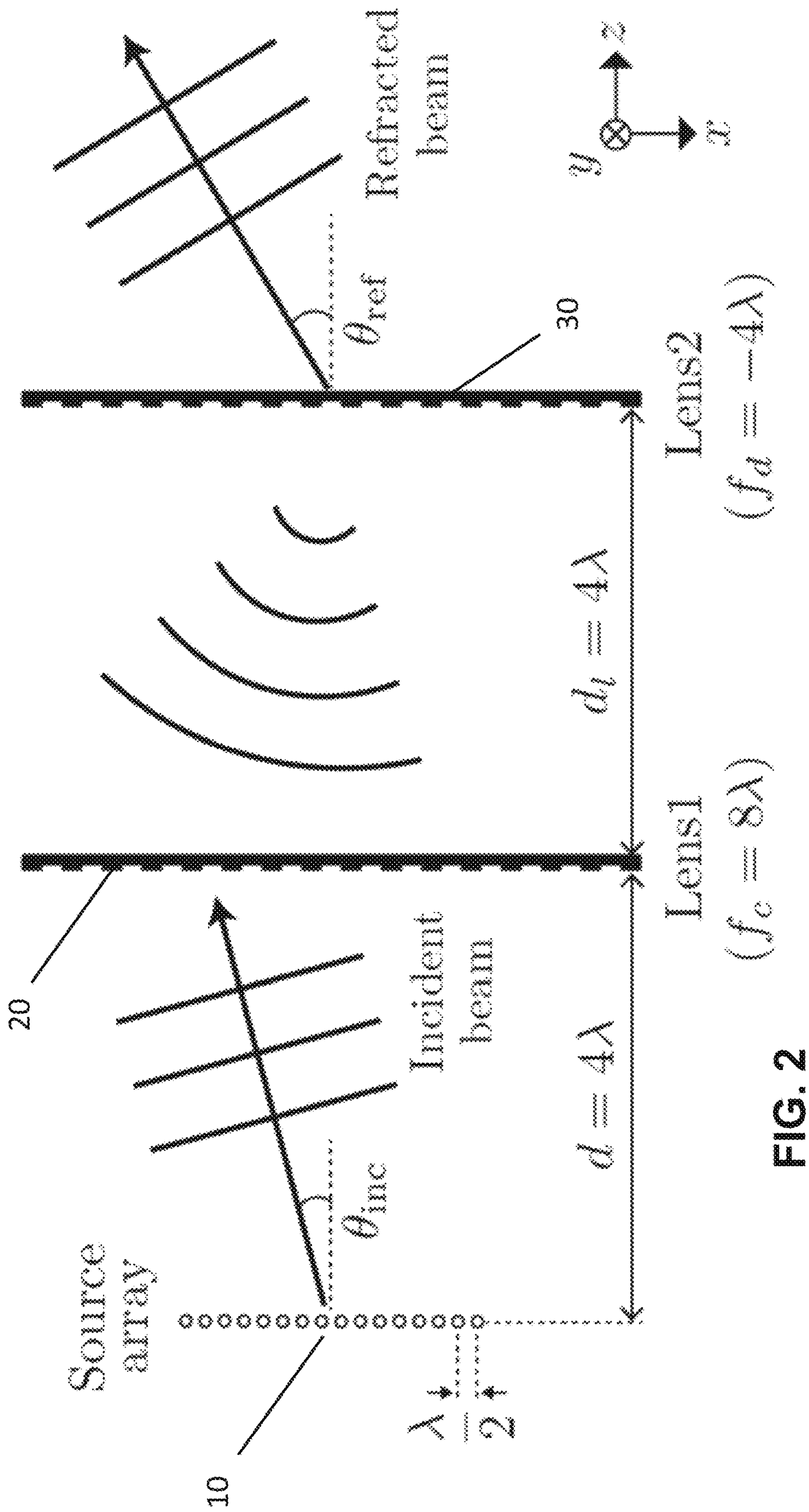
FIG. 2 shows a schematic representation of a device for extending a scan range of a phased antenna array, according to another embodiment of the disclosure.

FIG. 2 shows an example of the dual-lens scan-angle doubling system of FIG. 1 being operated at a frequency of 10 GHz. As can be seen, at this frequency, the spacing between antenna elements is $\lambda/2$, $d=4\lambda$, $d_l=4\lambda$, $f_c=8\lambda$, and $f_d=4\lambda$.

Figure 3:
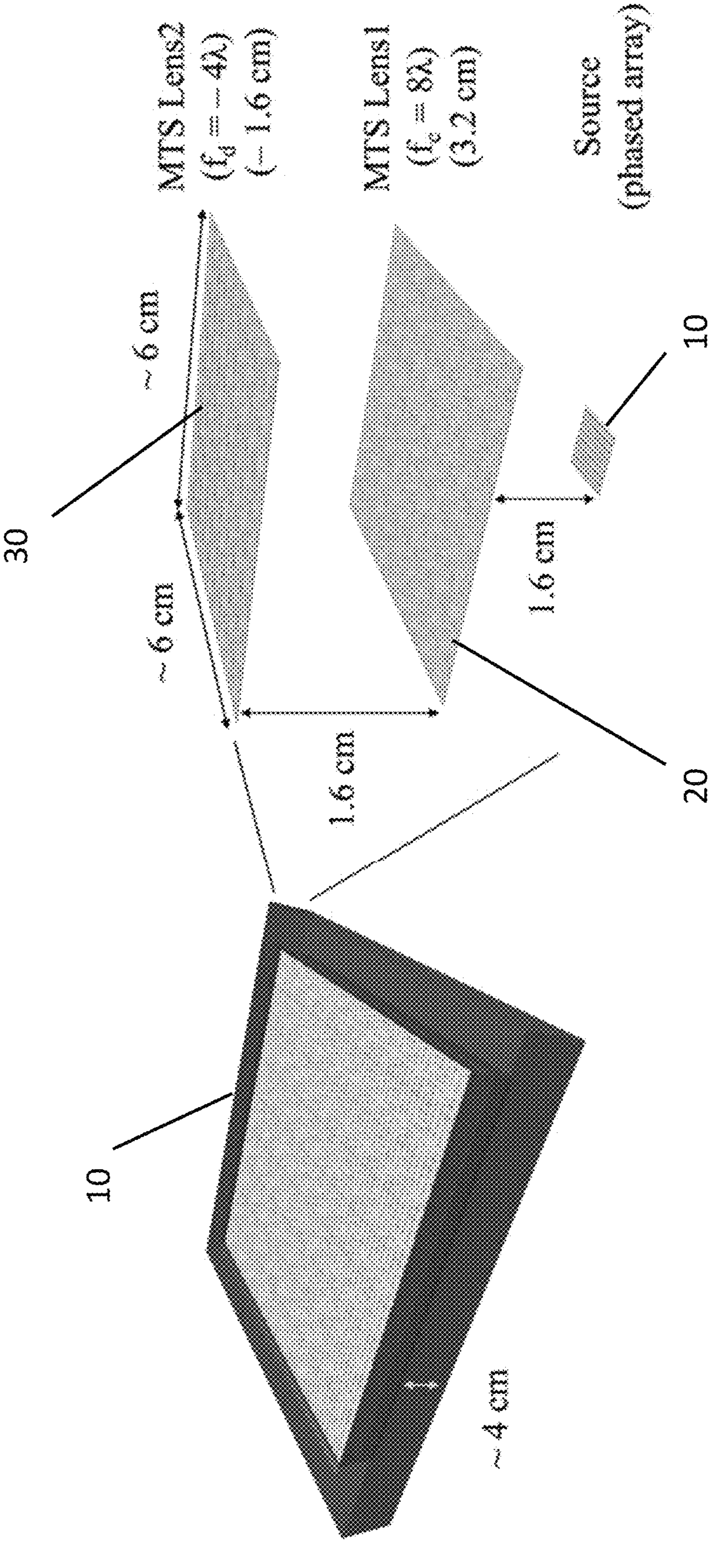
FIG. 3 is a schematic diagram of a phased antenna array and dual metasurface lenses for extending a scan range of the array, according to an embodiment of the disclosure.

FIG. 3 shows an example schematic layout of a dual-lens phased-array system operating at 73 GHZ, with dimensions included for illustrative purposes.

Figure 4B:
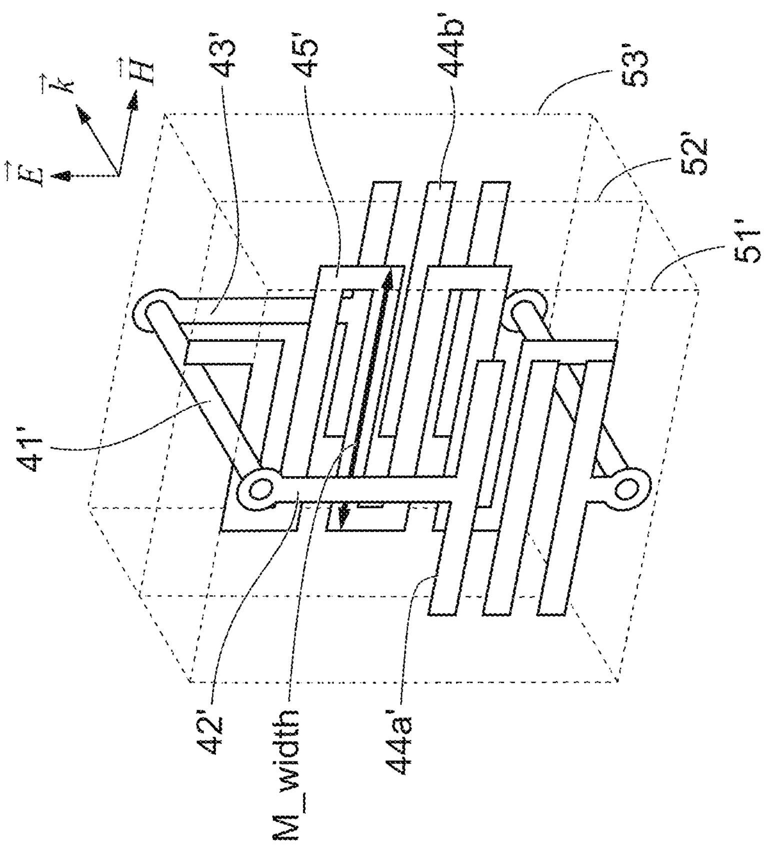
FIGS. 4A and 4B are schematic diagrams of unit cells of a metasurface lens, according to embodiments of the disclosure.
Figure 4A:
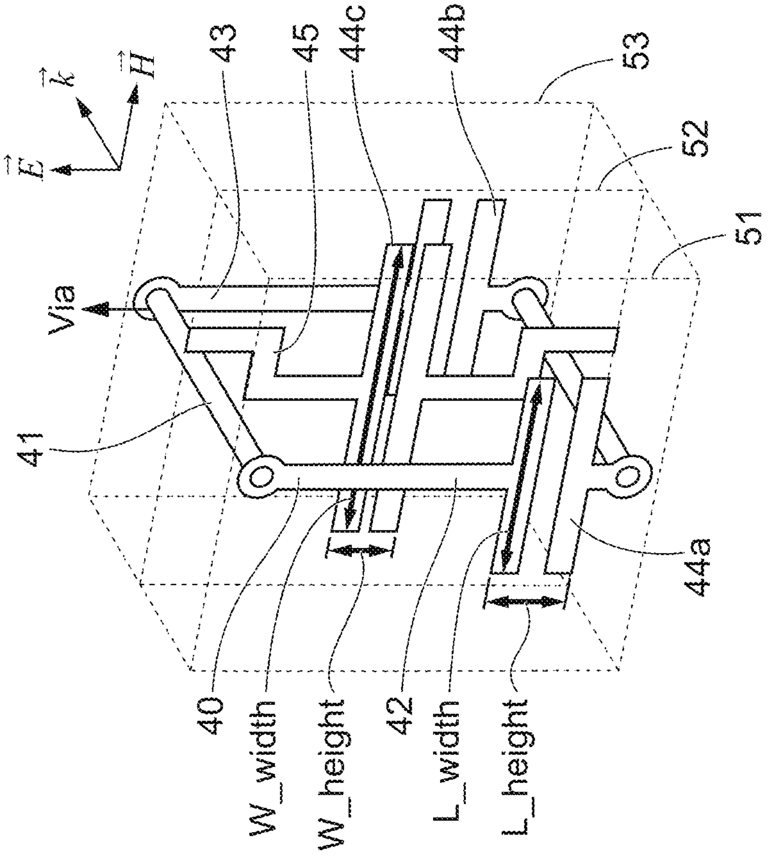

According to some embodiments, Huygens' metasurfaces may be used to form the two lenses. A Huygens' metasurface generally comprises a structure formed of unit cells that include metalized wire and loop structures that act as orthogonal electric and magnetic dipole moments. FIGS. 4A and 4B show embodiments of unit cells of Huygens' metasurfaces that may be used to form the two lenses. Turning to the example in FIG. 4A, the unit cell includes an outer metalized loop 40 and a metallized, capacitive central strip 45. Outer loop 40 provides a magnetic response to the incident electromagnetic waves, and central strip 45 provides an electric response to the incident electromagnetic waves. In particular, metallized loop 40 includes vias 41 extending from a front layer 51 of the unit cell to a rear layer 53 of the unit cell, and connecting front and rear elements 42 and 43. Front element 42 includes a pair of spaced-apart capacitive components 44*a* that extend transversely to the general direction of extension of front element 42. Rear element 43 includes a pair of spaced-apart capacitive components 44*b* that extend transversely to the general direction of extension of rear element 43. Central strip 45, extending along a middle layer 52 of the unit cell, also includes a pair of spaced-apart capacitive components 44*c* that extend transversely to the general direction of extension of central strip 45.

Turning to the example unit cell shown in FIG. 4B, the unit cells includes an outer metalized loop 40' and a metallized, inductive central strip 45'. Outer loop 40' provides a magnetic response to the incident electromagnetic waves, and central strip 45' provides an electric response to the incident electromagnetic waves. In particular, metallized loop 40' includes vias 41' extending from a front layer 51' of the unit cell to a rear layer 53' of the unit cell, and connecting front and rear elements 42' and 43'. Front element 42' includes a trio of spaced-apart capacitive components 44*a'* that extend transversely to the general direction of extension of front element 42'. Rear element 43' includes a trio of spaced-apart capacitive components 44*b'* that extend transversely to the general direction of extension of rear element 43'. Central strip 45' includes a serpentine structure extending along a middle layer 52' of the unit cell.

It shall be understood that the unit cells shown in FIGS. 4A and 4B are only examples of unit cells that may be used to form the metasurface lenses, and that units cell with different metallized structures may be used.

The unit cells shown in FIGS. 4A and 4B may advantageously reduce the degree of reflections at the surface of the metasurface, thus reducing losses and increasing the overall efficiency of the device. For example, according to some embodiments, reflections at the metasurface lenses may be no more than 3% or 5%, at each metasurface lens.

FIG. 5 shows simulation results of the above-described dual metasurface lenses used in combination with a 16×1 phased array. The radiation pattern on the left shows that the incident beam refracts from 15° to 30.35° off-broadside as a result of passing through the dual metasurface lenses. The figure on the right depicts the electric field distribution, $|Re\{E_y\}|$, in the H-plane.

Figure 6A:
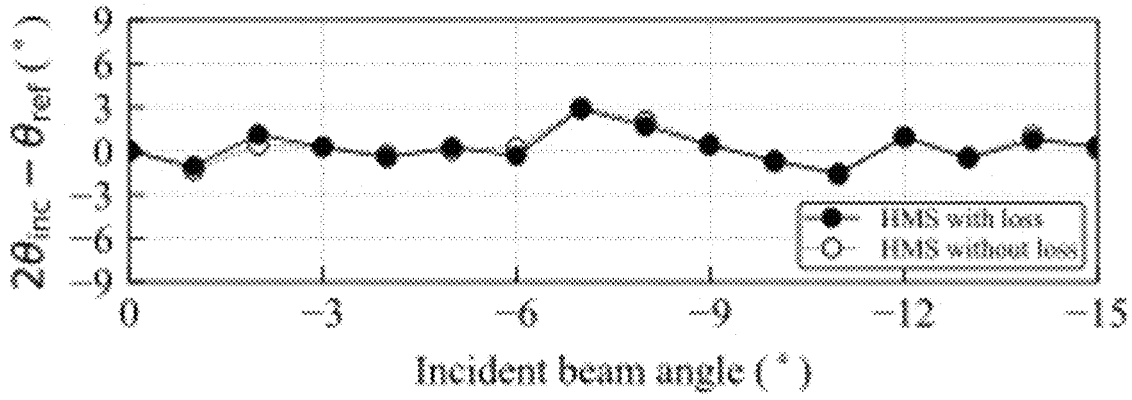
FIGS. 6A to 6C show plots of scan error, directivity, and directivity degradation as a function of incident beam angle, according to an embodiment of the disclosure.
Figure 6B:
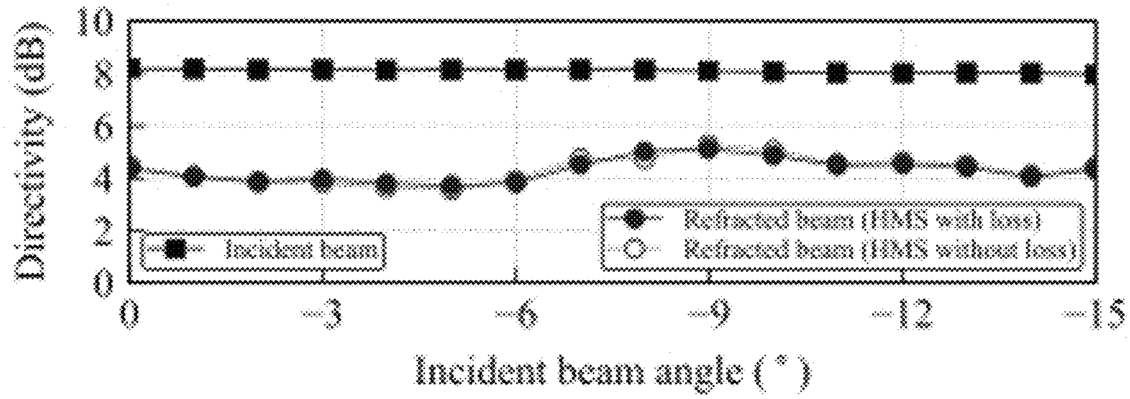
Figure 6C:
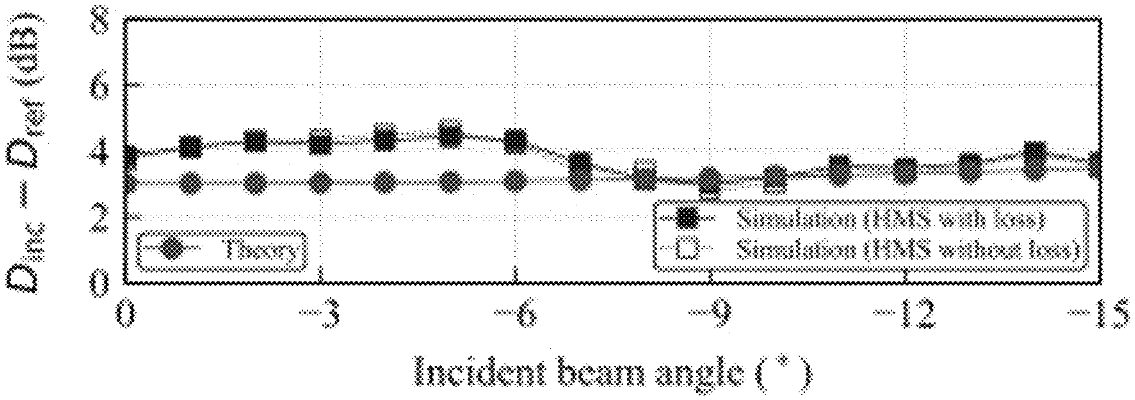

FIG. 6A is a plot showing the scan range enhancement of the dual-lens device, illustrating that the scan error, $|2\theta_{inc}-\theta_{ref}|$, is less than 2.9° when the incident beam angle is between −15° and 15°. FIG. 6B is a plot showing the peak directivities of the incident beam of the phased array and the refracted beam having passed through the dual metasurface lenses. FIG. 6C is a plot illustrating the degradation in directivity when the incident beam angle is below 15°. Physical constraints (such as power conservation) place a theoretical limit on the reduction of directivity degradation, this limit being theorized to be:

$$\frac{D_{ref}}{D_{inc}} = \frac{1}{a} \cdot \frac{\cos\theta_{ref}}{\cos\theta_{inc}},$$

wherein $D_{ref}$ is a directivity of the refracted beam and $D_{inc}$ is a directivity of the incident beam.

For $\alpha=2$, $D_{ref}/D_{inc}$ is 3 dB, and as can be seen by FIG. 6C the directivity degradation experienced by the beam is 3.24±0.24 dB, which is close to the theoretical minimum.

Figure 7:
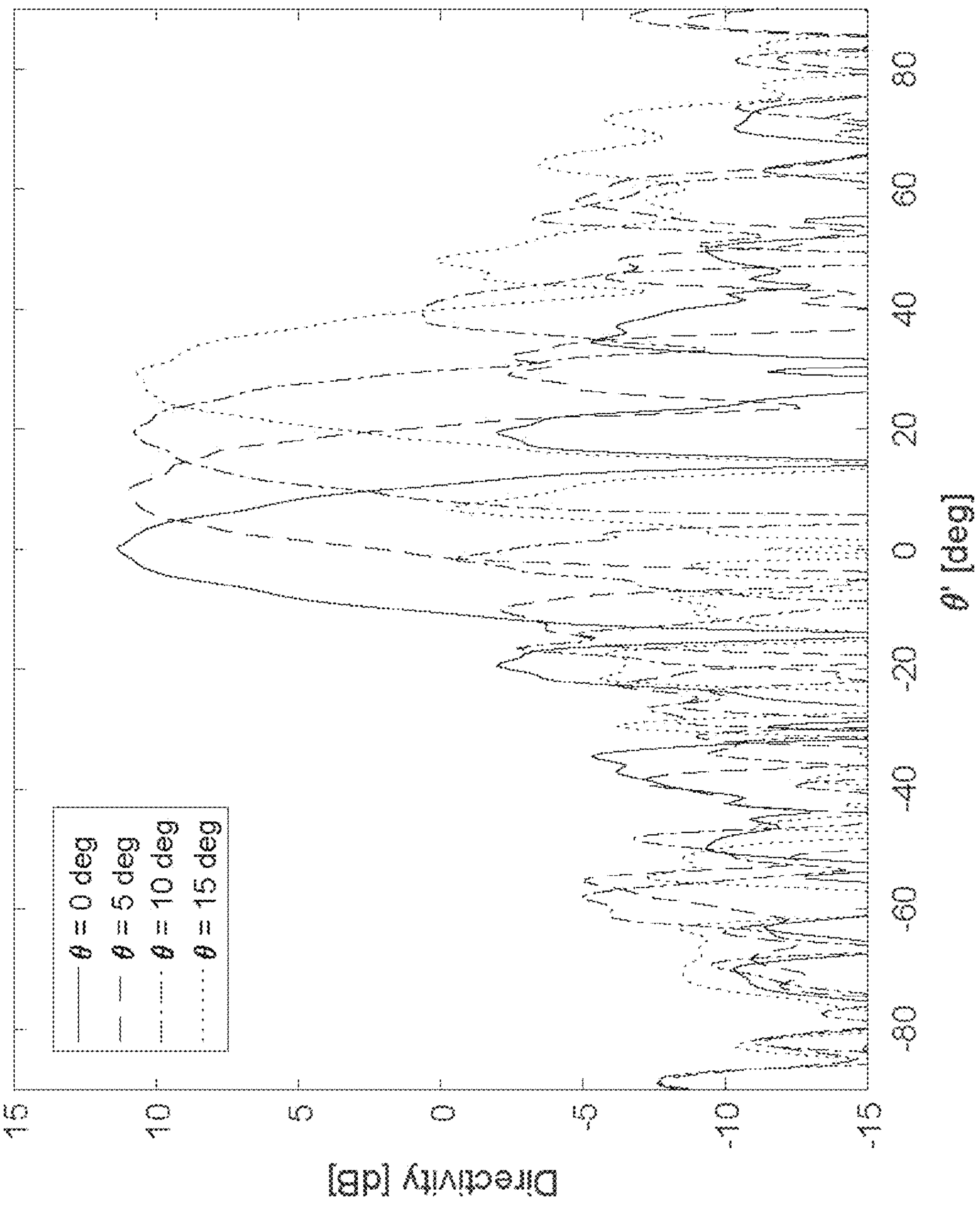
FIG. 7 shows a plot of directivity as a function of incident angle and refracted angle.

FIG. 7 shows a plot of directivity as a function of incident angle and refracted angle, using a 1x-16 phased antenna array scanning from $\theta=0$ to $\theta=15°$, and with $d_l=4\lambda$ and $d=2\lambda$. As can be seen, the peak directivity is roughly constant for beams of different incident angles.

Figure 8:
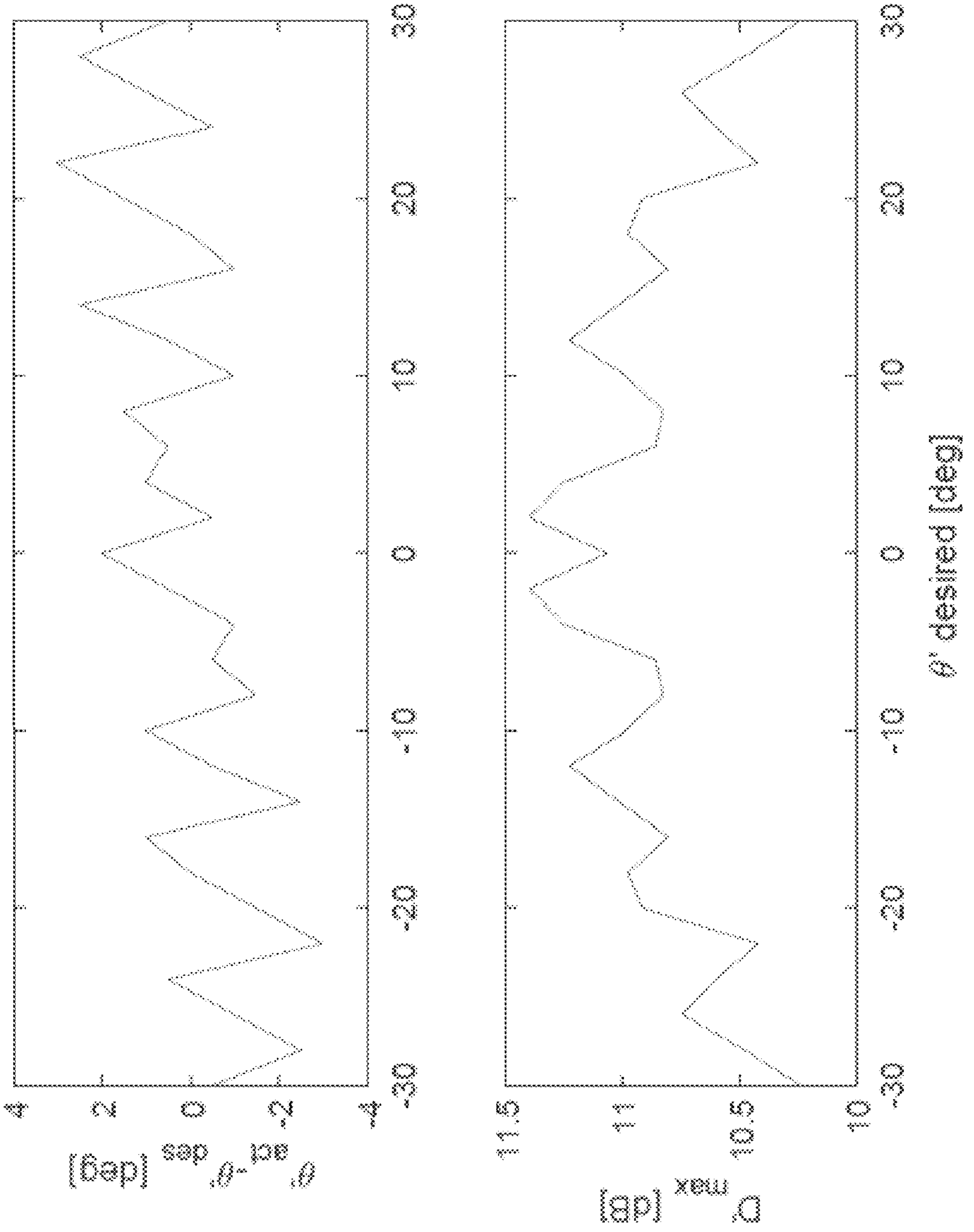
FIG. 8 shows plots of directivity degradation and scan angle error as a function of refracted angle, using a double-lens system according to an embodiment of the disclosure.
Figure 9:
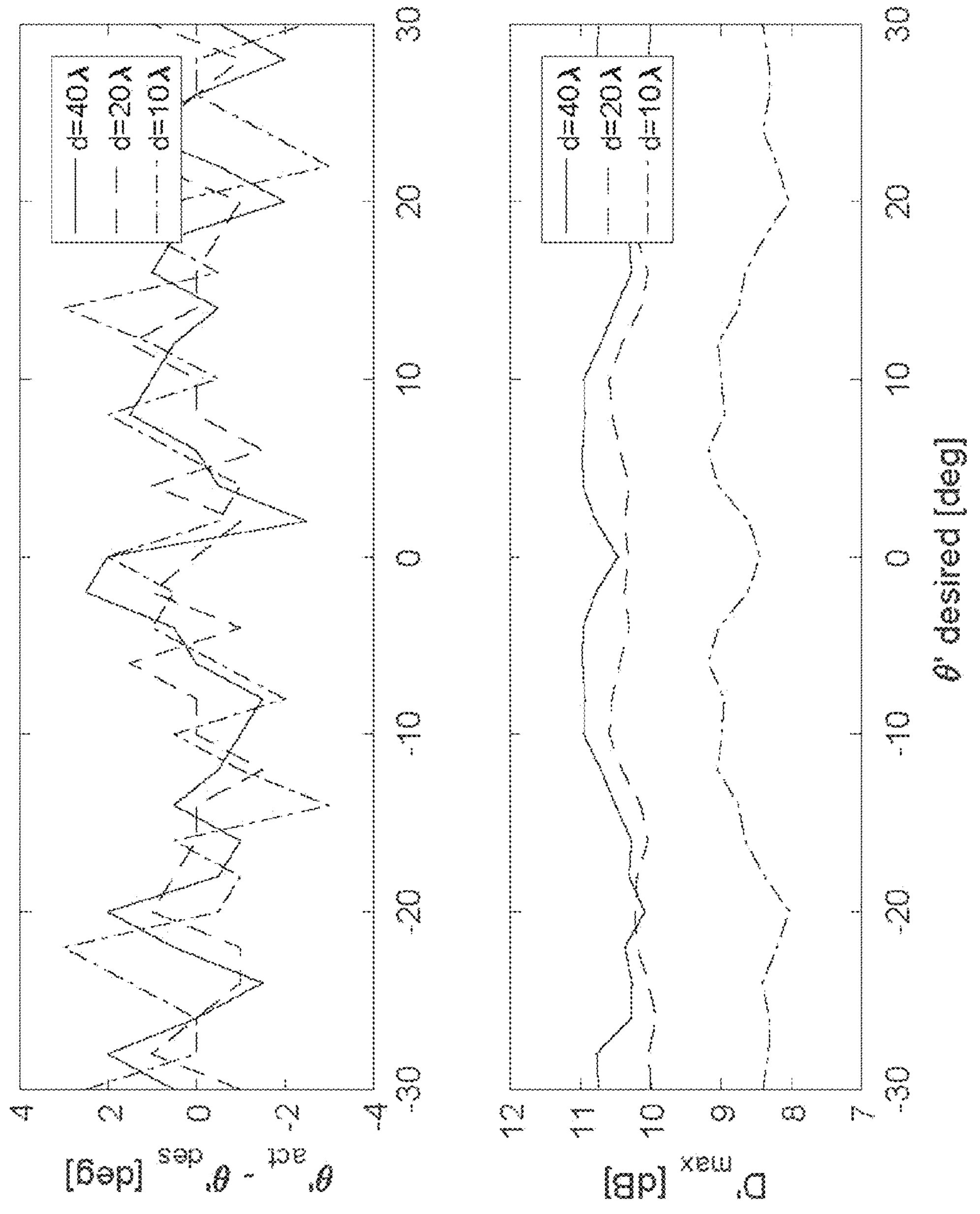
FIG. 9 shows plots of directivity degradation and scan angle error as a function of refracted angle, using a single-lens system.

FIG. 8 shows simulated plots of maximum directivity and scan angle error (accuracy) as a function of refracted angle. The simulation assumes an angle doubler as described herein, a 16-element, $\lambda/2$-spaced array composed of cylindrical sources, and with $d_l=4\lambda$ and $d=2\lambda$. For comparison purposes, FIG. 9 shows plots of maximum directivity and scan angle error as a function of refracted angle, using a device that employs a single metasurface lens. As can be seen from FIG. 9, when d=10λ, the directivity of the beam is degraded sharply to less than 10 dB, and if d decreases then the directivity degradation also decreases.

Figure 10:
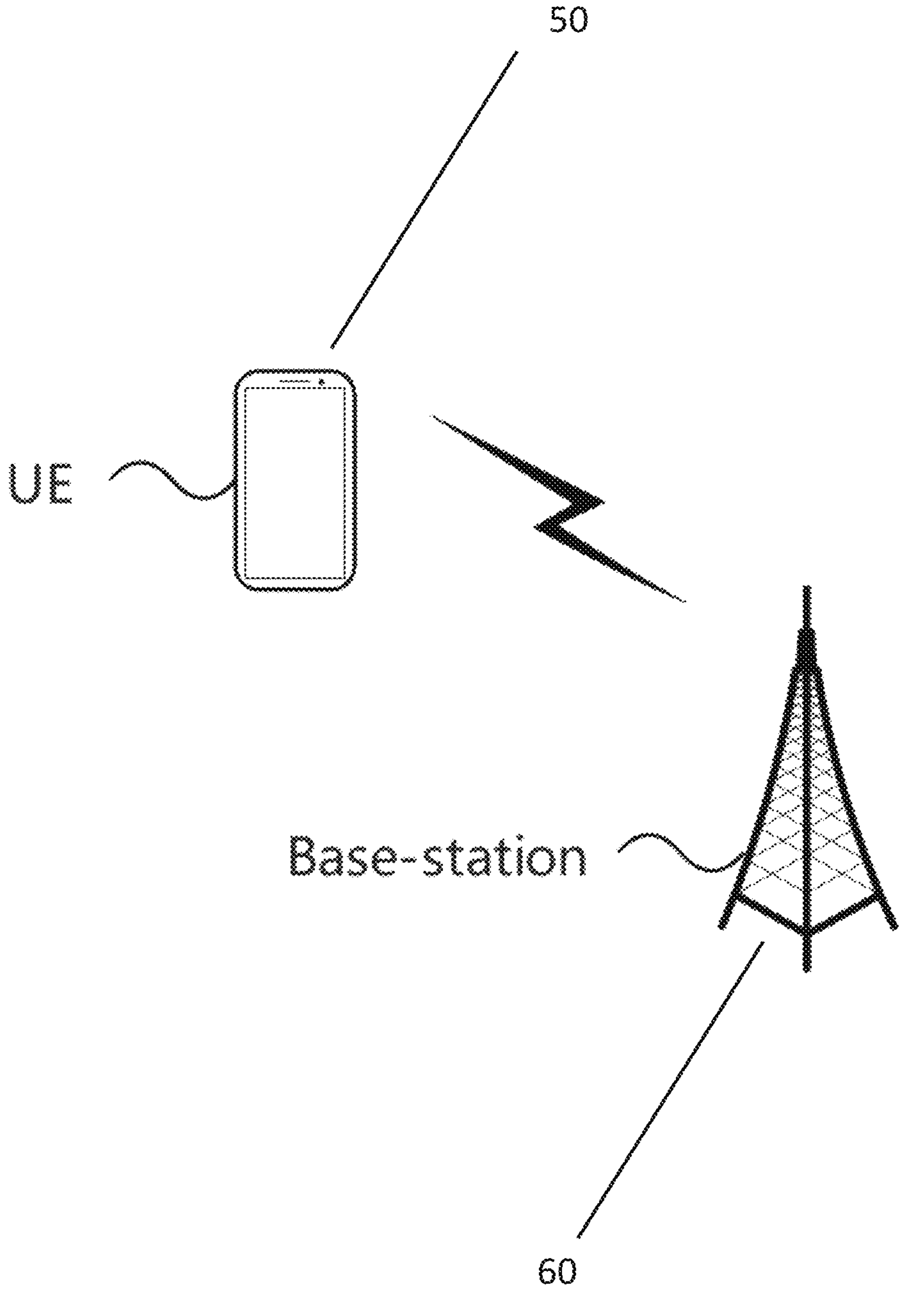
FIG. 10 shows a schematic example of a wireless communication network including a base station and a user device, according to an embodiment of the disclosure.

FIG. 10 shows a schematic example of a wireless communication network including a base station 60 operable to wirelessly communicate with a user device 50, according to an embodiment of the disclosure. Base station 60 includes a phased antenna array, and may further include any of the devices as described herein, for increasing a scan range of the phased antenna array.

Figure 11:
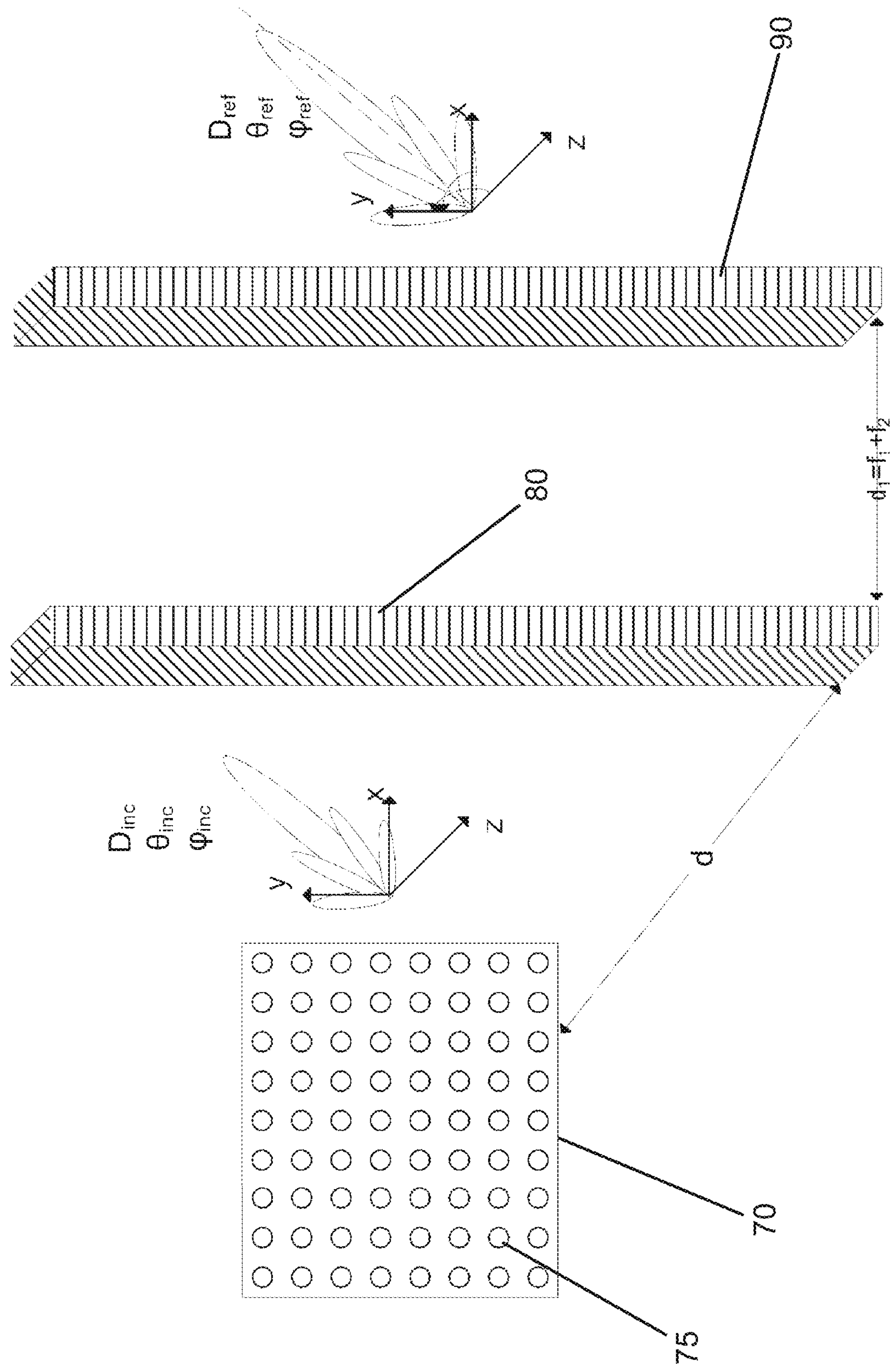
FIG. 11 shows a schematic diagram of a device for extending a b scan range of a phased antenna array, according to another embodiment of the disclosure.

FIG. 11 shows another example of a device for extending a scan range of a phased antenna array, according to another embodiment of the disclosure. The arrangement includes a phased antenna array 70 with an array of elements 75, and dual lenses comprising a first, converging metasurface lens 80 and a second, diverging metasurface lens 90 positioned in relation to antenna array 70. For the sake of clarity and in order to illustrate elements 75, FIG. 11 shows antenna array 70 oriented perpendicularly to lens 80. In reality, antenna array 70 is oriented so as to be generally parallel to lens 80.

There will now be described example designs of a device for increasing a scan range of a phased antenna array, according to further example embodiments of the disclosure.

According to these example embodiments, the desired scan range of the angle enhancement system is from −30° to +30°, whereas the source array steers its beam electronically between −15° and +15°. The HMS unit cells are designed with a wire-loop topology to exhibit high transmittance over all required phase angles. A stacked-layer unit cell topology may also be used for designing HMSs by using an equivalent transmission-line model. However, the stacked-layer HMS unit cells can suffer from significant losses when the phase angle of $S_{21}$ is near 0° due to resonance. Hence, the power transmission efficiency of HMSs can be compromised. On the other hand, the wire-loop unit cells according to the presently-described embodiments may exhibit high transmittance for the desired phase angles of $S_{21}$ including 0° as shown with full-wave simulations. Additionally, the scan angle of the lossy two-HMS scan-angle doubler is enhanced by almost a factor of 2 and with low scan error, when the incident beam angle is between −15° and +15°.

Ray tracing through the two-lens system can be expressed by ray transfer matrix analysis. The ray transfer matrix for a two-lens system is shown in (1) and (2), which gives the position and angle of a ray when passing through the lenses:

$$\begin{bmatrix} x' \\ \theta_{ref} \end{bmatrix} = \begin{bmatrix} A & B \\ C & D \end{bmatrix} \begin{bmatrix} x \\ \theta_{inc} \end{bmatrix}, \tag{1}$$

where A, B, C, and D are given by $$A = 1 - \frac{d_l}{f_1} \tag{2}$$

$$B = d\left(1 - \frac{d_l}{f_1}\right) + d_l$$

$$C = \frac{1}{f_1 f_2}(d_l - f_1 - f_2)$$

$$D = 1 - \frac{d_l}{f_2} + \frac{d}{f_1 f_2}(d_l - f_1 - f_2),$$

where d is the distance between a source and the first lens, $d_l$ is the distance between the two lenses, and $f_1$ and $f_2$ are the focal lengths of the respective lenses. According to some embodiments, C and D in the transfer matrix may satisfy the condition in (3):

$$d_l - f_1 - f_2 = 0 \tag{3}$$

As a result, the desired angle of a ray passing through the two-lens system can be obtained by (4), where α is the angular scan enhancement factor for the two-lens system:

$$\theta_{ref} = \left(1 - \frac{d_l}{f_2}\right)\theta_{inc} = \alpha\theta_{inc} \tag{4}$$

For the two-lens system to function as a scan-angle doubler, α may be at least 2, which leads to $f_1=2d_l=f_c$ and $f_2=-d_l=f_d$, where $f_c$ and $f_d$ are the focal lengths of the converging and diverging lens, respectively. Here, the angle-doubling system takes $d_l=4\lambda$ at 10 GHz resulting in $f_c=8\lambda$ and $f_d=-4\lambda$, as shown in FIG. 2. The source array is located at a distance d=4λ away from the first converging lens. The array comprises 16-element infinitely long electric current line sources, λ/2-spaced, to propagate transverse electric (TE) polarized fields. The array is phased to create off-broadside beams between −15° and 15°.

Huygens' metasurface (HMS) lenses are used because the HMS unit cells can be designed with high magnitude of $S_{21}$ over all required phase angles. The phase angles of $S_{21}$ of the HMS lenses should be specified by (5) as the quadratic phase profile for a lens, $$\phi(x) = \operatorname{sgn}(f)\frac{2\pi}{\lambda}\left(\sqrt{x^2 + f^2} - |f|\right), \tag{5}$$

where f is the focal length of a lens and x is the position from the center of the lens. The signs, sgn(f), + and − are specified for the converging and diverging lens, respectively.

The HMS unit cell contains co-located orthogonal electric and magnetic dipole moments to satisfy the boundary conditions for a desired wave transformation. The electric and magnetic dipoles in the unit cell are represented by a scalar surface electric impedance and magnetic admittance for TE polarized fields.

A wire-loop topology was used to design the HMS unit cells. The unit cells have certain surface impedances and admittances in order for the unit cells to synthesize the required $S_{21}$ phase angles. The surface impedances of the wire and loop are determined by printed capacitors or inductors in each structure. FIGS. 4A and 4B show the HMS unit cell layout, comprising physical wire and loop structures with simulation parameters for a Rogers RO3003 substrate (thickness=1.524 mm, $\varepsilon_r=3$, and tan δ=0.0013) and 2929 bondply (thickness=0.0508 mm and $\varepsilon_r=2.94$). The thickness of the copper layer on the substrates to form the wire and loop structures is 18 μm. The wire structure is shaped by a printed capacitor or inductor on the inner layer of one of the substrates. The loop structure is formed by printed capacitors on the outer layers of the two substrates with two vias. The two substrates are attached by a bonding material. The area of the unit cell surface is 4 mm×4 mm.

The magnetic field in the x direction polarizes only the loop. However, the electric field in the y direction excites not only the wire in the middle layer but also the loop. Therefore, the desired magnetic admittance of the unit cell may be set by tuning the printed capacitor in the loop, and then the electric impedance may be adjusted by tuning the printed capacitor or inductor in the wire.

Figure 12:
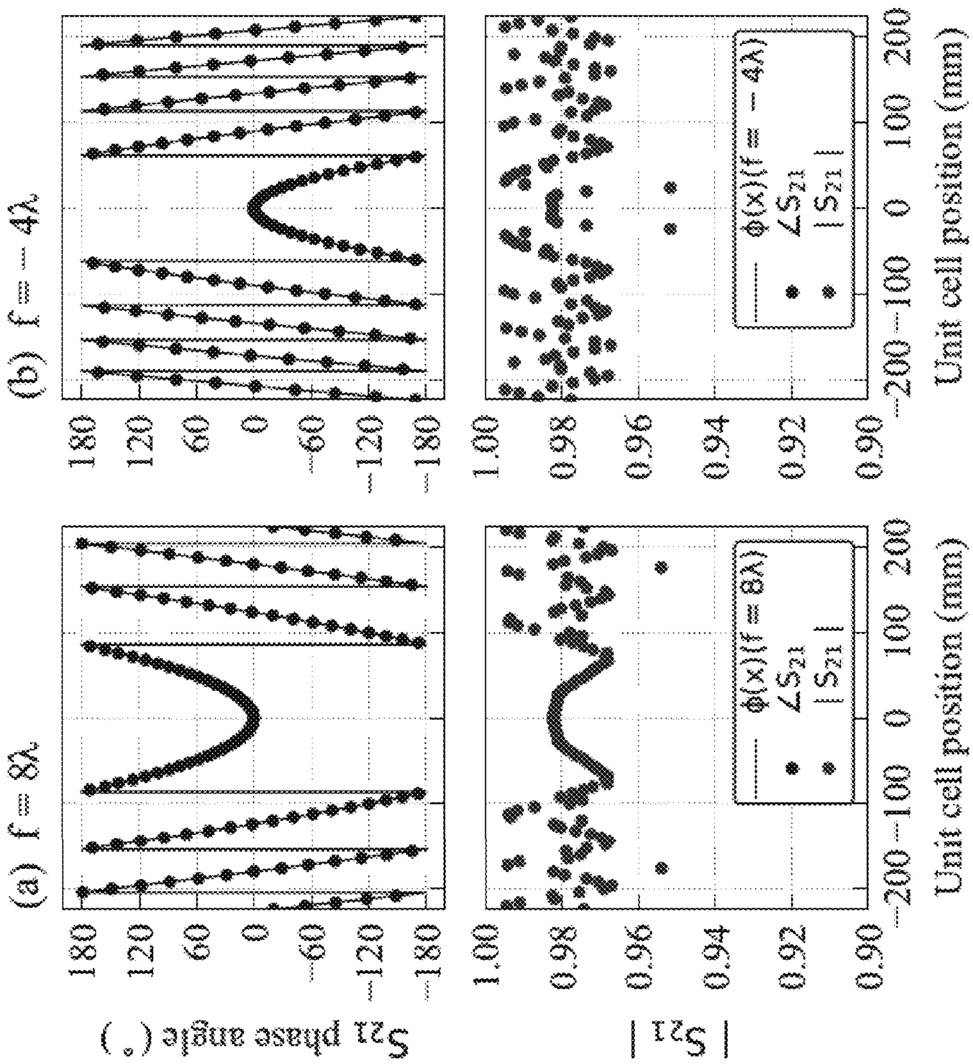
FIG. 12 shows plots of phase angle and magnitude of $S_{21}$ for each unit cell forming a converging lens ($f=8\lambda$) and a diverging lens ($f=-4\lambda$), according to embodiments of the disclosure.

According to the above design, a wire-loop unit-cell library covering the entire $S_{21}$ phase range may be created. The unit cells were synthesized by the full-wave electromagnetics solver CST microwave studio. Infinite periodic array analysis with these unit cells was performed. FIGS. 12 (*a*) and (*b*) shows the magnitude and phase of $S_{21}$ of the HMS unit cells at the corresponding unit cell position for the converging lens (f=8λ) and the diverging lens (f=−4λ), respectively. Moreover, the required phase profile, Ø(x), for the two lenses is shown with the black curve. As shown, $|S_{21}|$ of the HMS unit cells for the converging lens and the diverging lens is 0.97 and 0.98 on average, respectively.

Figure 5A:
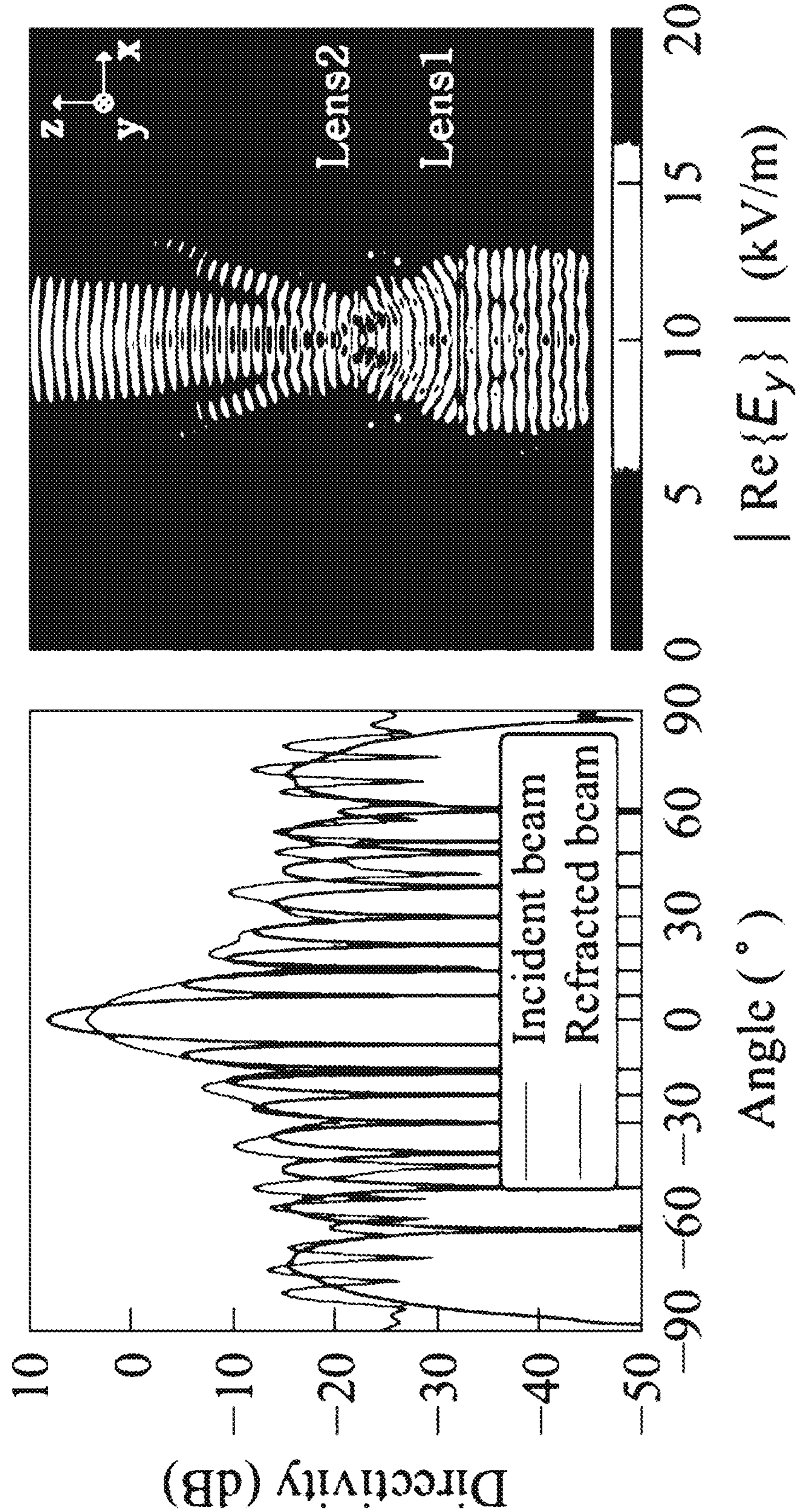
FIGS. 5A and 5B show plots of directivity as a function of beam angle, and electric field strength as a function of distance from a phased antenna array, according to embodiments of the disclosure.
Figure 5B:
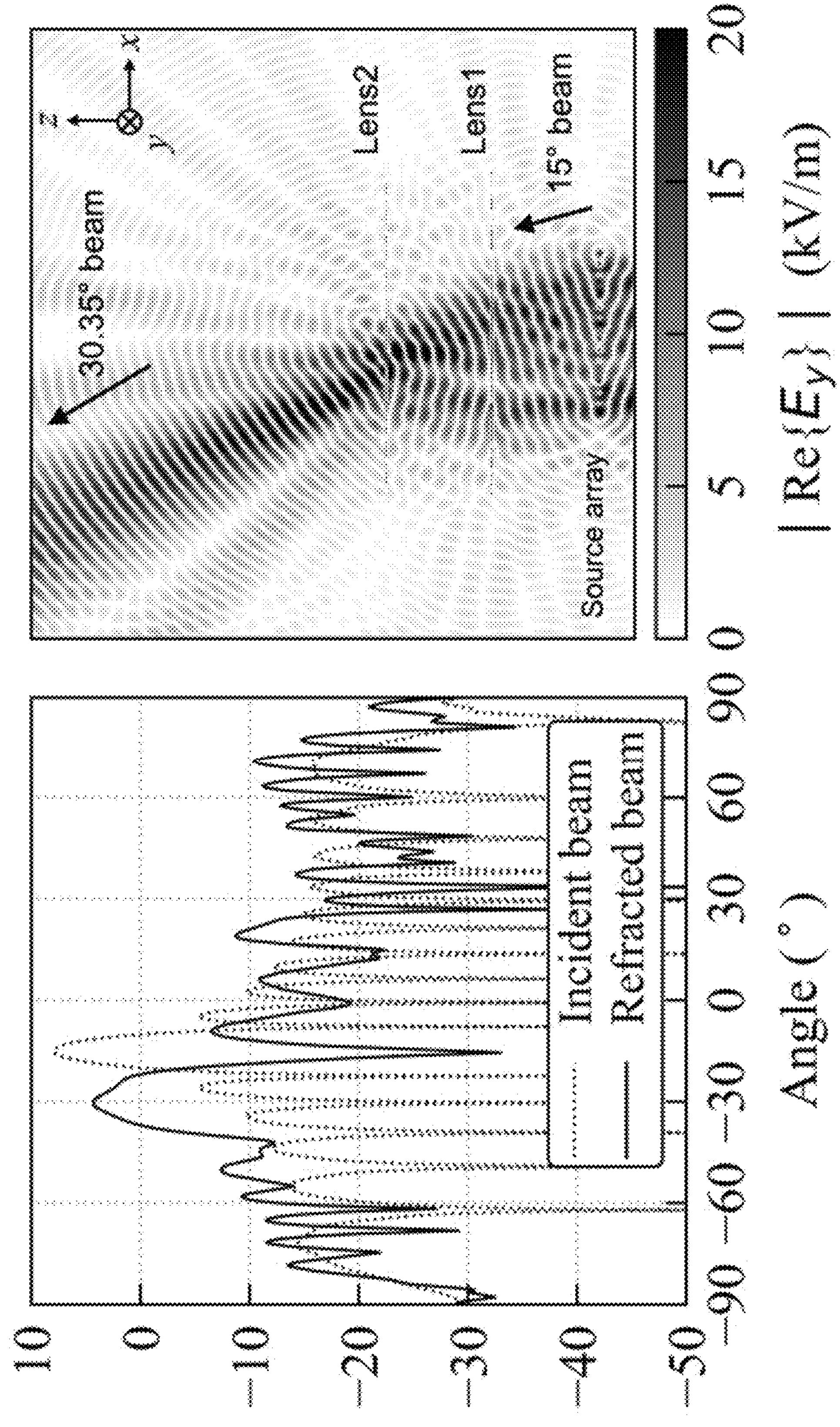

The designed two-lens HMS system was used as an angle-doubler with the wire-loop unit cells, as simulated by CST microwave studio. In the simulation, the realized periodicity of the 1D lens array and the source array are in the y direction. Moreover, horizontal upper and lower perfect electric conductor (PEC) walls were set at y=2 mm and −2 mm as boundary conditions. FIG. 5A depicts the radiation pattern of the incident beam and the refracted beam by the two-lens system in the H-plane and the electric field distribution $|Re\{E_y\}|$ when the incident beam is at broadside. The transmission efficiency of the two-HMS lens system defined as the ratio of the normally transmitted beam power passing through the two lenses to the incident beam power at broadside is 85%. In addition, the reflectance of the broadside beam to the system is 3.4%. As shown, at broadside, the incident beam from the phased array becomes a diverging beam with a directivity degradation of 3.8 dB. Note that theoretically the directivity reduction when passing through the two-lens system is given by (6):

$$\frac{D_{ref}(\theta_{ref})}{D_{inc}(\theta_{inc})} = \frac{1}{\alpha} \cdot \frac{\cos\theta_{ref}}{\cos\theta_{inc}}, \tag{6}$$

where $D_{ref}$ is the directivity of the beam passing through the two lenses, $D_{inc}$ is the directivity of the beam from the source array, and a is the angular scan enhancement factor. Accordingly, theoretically, a 3 dB degradation of the directivity of this system at broadside incidence is unavoidable, and, at off-broadside incidence, the directivity will be degraded even more. FIG. 5B shows the same plot as FIG. 5A, but the incident beam angle is changed to −15° off broadside. It is shown that the beam angle is extended from −15° to −30.35° by the two HMS lenses. Furthermore, the directivity difference between the incident beam and the refracted beam is 3.63 dB, which is in good agreement with the expected degradation at this incident angle, which is 3.48 dB according to (6).

Lastly, the angle doubling performance of the two-HMS lens system at various incident beam angles is analyzed. FIG. 6A proves that the two-HMS lens system performs well as an angle doubler by showing that the magnitude of the scan error defined as $|2\theta_{inc}-\theta_{ref}|$ is less than 2.87° when the incident angles are below −15°. FIG. 6B describes the peak directivities of the incident beam from the phased array and the refracted beam passing through the angle-doubler. FIG. 6C shows that the directivity degradation at incident beam angles below 15° is 3.7±0.7 dB according to the simulation, while the theoretical directivity degradation at the same angle is 3.24±0.24 dB. The slight discrepancy between simulation and theory might be contributed by the fact that the HMS unit cell design assumes a normally incident beam, but we have considered oblique beam incidence on the HMS lenses. It is also worth noting that material losses of the HMSs do not affect the directivity degradation, as shown in FIGS. 6A to 6C. Namely, the simulation results conducted with ideal materials such as PEC and lossless dielectric substrate (tan δ=0) show very little difference from those with copper and a lossy dielectric substrate (Rogers RO3003). Here, the simulated power loss through the two lenses is 11.6%.

As can be seen, a physical design with lossy materials for a two-Huygens' metasurface lens system, for doubling the scan angle of a phased array, has been demonstrated. Design parameters for the two-HMS angle doubler are obtained based on ray optics analysis. The HMS lenses are designed for a quadratic $S_{21}$ phase profile, and the wire-loop topology is deployed to implement their unit cells. The HMS-lens doubler is placed in the near-field of the phased array leading to a compact architecture. The performance of the system has been proven by full-wave simulations. The magnitude of $S_{21}$ of the unit cells for the converging lens and the diverging lens are 0.97 and 0.98 on average, respectively, covering the entire $S_{21}$ phase angles. Furthermore, the proposed two-lens HMS angle doubler functions properly showing that the scan angle of a uniform phased array is enhanced by a factor of two when the angle of incidence is between −15° and +15°. The simulation results show that the directivities of the beams refracted by the two-HMS lens system are degraded by nearly 3.7 dB, in good agreement with theory.

The word "a" or "an" when used in conjunction with the term "comprising" or "including" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

The terms "coupled", "coupling" or "connected" as used herein can have several different meanings depending on the context in which these terms are used. For example, as used herein, the terms coupled, coupling, or connected can indicate that two elements or devices are directly connected to one another or connected to one another through one or more intermediate elements or devices via a mechanical element depending on the particular context. The term "and/or" herein when used in association with a list of items means any one or more of the items comprising that list.

As used herein, a reference to "about" or "approximately" a number or to being "substantially" equal to a number means being within +/−10% of that number.

While the disclosure has been described in connection with specific embodiments, it is to be understood that the disclosure is not limited to these embodiments, and that alterations, modifications, and variations of these embodiments may be carried out by the skilled person without departing from the scope of the disclosure.

It is furthermore contemplated that any part of any aspect or embodiment discussed in this specification can be implemented or combined with any part of any other aspect or embodiment discussed in this specification.

The invention claimed is:

1. A device comprising:

a phased antenna array operable to generate a radio-frequency beam having a first beam angle;

a converging lens for adjusting the beam generated by the phased antenna array to output a first adjusted beam; and a diverging lens for adjusting the first adjusted beam to output a second adjusted beam having a second beam angle, wherein the converging lens and the diverging lens are positioned relative to the phased antenna array such that the second beam angle is greater than the first beam angle, and such that as a result a scan range of the phased array is increased.

2. The device of claim 1, wherein:

the converging lens comprises a first metasurface having formed thereon first subwavelength structures for manipulating electromagnetic waves of the beam generated by the phased antenna array; and the diverging lens comprises a second metasurface having formed thereon second subwavelength structures for manipulating the electromagnetic waves manipulated by the first subwavelength structures.

3. The device of claim 2, wherein one or more of each of the first subwavelength structures and each of the second subwavelength structures comprises:

a metallized loop structure comprising at least one capacitive element; and a metallized central strip comprising one or more of:

at least one inductive or capacitive element; or a serpentine shape.

4. The device of claim 3, wherein one or more of each of the first subwavelength structures and each of the second subwavelength structures is configured such that one or more of the beam generated by the phased antenna array and the first adjusted beam is reflected by no more than 5% when the beam interacts with the subwavelength structure.

5. The device of claim 2, wherein one or more of the converging lens and the diverging lens has one or more of:

at least one of a width of from about 10λ to about 15λ or a length of from about 10λ to about 15λ, wherein λ is a wavelength of electromagnetic waves of the beam generated by the phased antenna array; or a thickness of less than 1λ.

6. The device of claim 1, wherein the phased antenna array, the converging lens, and the diverging lens are positioned relative to one another such that $d_l - f_c - f_d = 0$, wherein:

$d_l$ is a distance separating the converging lens from the diverging lens;

$f_c$ is a focal length of the converging lens; and $f_d$ is a focal length of the diverging lens.

7. The device of claim 6, wherein $1-(d_l/f_d)$ is at least 2, wherein:

$d_l$ is a distance separating the converging lens from the diverging lens; and $f_d$ is a focal length of the diverging lens.

8. The device of claim 1, wherein one or more of the converging lens and the diverging lens are planar.

9. The device of claim 1, wherein one or more of the converging lens and the diverging lens are curved.

10. The device of claim 1, wherein the converging lens and the diverging lens are located in a near-field region of the phased antenna array.

11. A method of increasing a scan range of a phased antenna array, comprising:

generating, using the phased antenna array, the radio-frequency beam having a first beam angle;

receiving, by a converging lens, the radio-frequency beam, and outputting a first adjusted beam from the converging lens; and receiving, by a diverging lens, the first adjusted beam, and outputting a second adjusted beam from the diverging lens, wherein the second adjusted beam has a second beam angle, wherein the second beam angle is greater than the first beam angle such that the scan range of the phased array is increased.

12. The method of claim 11, wherein one or more of:

the beam is reflected by no more than 5% as the beam passes through the converging lens; or the first adjusted beam is reflected by no more than 5% as the first adjusted beam passes through the diverging lens.

13. The method of claim 11, wherein, after passing through the converging lens and the diverging lens, a degradation of a directivity of the beam is no more than 3 dB.

14. The method of claim 11, wherein:

the converging lens comprises a first metasurface having formed thereon first subwavelength structures for manipulating electromagnetic waves of the beam; and the diverging lens comprises a second metasurface having formed thereon second subwavelength structures for manipulating the electromagnetic waves manipulated by the first subwavelength structures.

15. The method of claim 14, wherein one or more of each of the first subwavelength structures and each of the second subwavelength structures comprises:

a metallized loop structure comprising at least one capacitive element; and a metallized central strip comprising one or more of:

at least one inductive or capacitive element; or a serpentine shape.

16. The method of claim 11, wherein one or more of the converging lens and the diverging lens has one or more of:

at least one of a width of from about 10λ to about 15λ or a length of from about 10λ to about 15λ, wherein λ is a wavelength of electromagnetic waves of the beam; or a thickness of less than 1λ.

17. The method of claim 11, wherein the phased antenna array, the converging lens, and the diverging lens are positioned relative to one another such that $d_l - f_c - f_d = 0$, wherein:

$d_l$ is a distance separating the converging lens from the diverging lens;

$f_c$ is a focal length of the converging lens; and $f_d$ is a focal length of the diverging lens.

18. The method of claim 11, wherein $1-(d_l/f_d)$ is at least 2, wherein:

$d_l$ is a distance separating the converging lens from the diverging lens; and $f_d$ is a focal length of the diverging lens.

19. The method of claim 11, wherein one or more of the converging lens and the diverging lens are planar or curved.

20. The method of claim 11, wherein the converging lens and the diverging lens are located in a near-field region of the phased antenna array.

* * * * *